United States Patent

[11] 3,576,582

| [72] | Inventor | Robert T. Smith, Jr. |
| | | Hatboro, Pa. |
| [21] | Appl. No. | 733,506 |
| [22] | Filed | May 31, 1968 |
| [45] | Patented | Apr. 27, 1971 |
| [73] | Assignee | Honeywell Inc. |
| | | Minneapolis, Minn. |

[54] MULTIPLE POINT RECORDER
13 Claims, 14 Drawing Figs.

[52] U.S. Cl. .................................................. 346/34,
346/46, 346/61, 346/106, 317/112
[51] Int. Cl. ...................................................... G01d 9/34
[50] Field of Search .......................................... 346/34, 46,
50, 106, 105

[56] References Cited
UNITED STATES PATENTS

| 1,210,233 | 12/1916 | Tomlinson | 346/105X |
| 1,413,646 | 4/1922 | Wood | 346/46 |
| 1,564,558 | 12/1925 | Grisdale | 346/46 |
| 2,425,080 | 8/1947 | Blakeslee | 346/34 |
| 2,976,103 | 3/1961 | Flanders et al. | 346/29 |
| 3,189,910 | 6/1965 | Blakeslee | 346/34X |
| 3,351,949 | 11/1967 | Brown | 346/94 |

*Primary Examiner*—Joseph W. Hartary
*Attorneys*—Arthur H. Swanson and Lockwood D. Burton ABSTRACT: A multiple point recorder is provided having printing means which are electrically actuated to print record trace marks and trace identifying marks on a record member. Incorporated in the recorder are selective printing switch means whereby the selection of input points to be processed may be programmed electrically, even during recorder operation, and additional switching means operative to select the frequency at which trace identifying marks are printed. Means are also provided in the recorder to color code the record trace and trace identifying marks printed by use of a multiple color band printing ribbon.

INVENTOR.
ROBERT T. SMITH, JR.

ATTORNEY.

INVENTOR.
ROBERT T. SMITH, JR.

ATTORNEY.

3,576,582

1

MULTIPLE POINT RECORDER

The present invention relates to electrical apparatus, and more particularly to apparatus for recording the values of electrical signals representative of physical phenomena.

There have, heretofore, been provided recording instruments which are adapted to produce records of a plurality of phenomena by sequentially scanning a plurality of input circuits, then producing indicia representative of the instantaneous value of the measured variables, so called multiple point recorders. In that manner, a separate trace, usually a series of dots, was produced for each of the input signals, each trace representative of a particular phenomenon. Further, means have been included in such systems for selectively preventing selected input points sensed by the scanning means from producing record traces on the ultimate record member irrespective of the presence of input signals on those points. Also, means have been provided for identifying the several traces thus produced, either by numerals, by different colored inks, or by both.

The present invention is an improvement over those prior art instruments. In those instruments of the prior art, the mechanism for effecting the printing of the record trace marks on a record member involved large, cumbersome, mechanical linkages. Further, those devices which included the capacity to select certain of the input signals for recording accomplished the selection through a mechanical program means with a corresponding mechanical sensor means for detecting the programmed selection of the input points. With that type of program means the selection of the input points to be recorded could not be changed without interrupting the operation of the recording instrument.

It is, accordingly, an object of the present invention to provide an improved multiple point recording instrument which obviates the disadvantages of prior art instruments.

It is another object of the present invention to provide an improved multiple point recording instrument wherein the selection of input points to be processed is programmed and accomplished electrically.

It is a further object of the present invention to provide an improve multiple point recording instrument as set forth wherein the programmed selection of input points to be processed may be changed without interrupting the operation of the instrument.

It is yet another object of the present invention to provide an improved multiple point recording instrument as set forth which features an improved printing means for printing trace records and trace identifying marks.

It is a still further object of the present invention to provide an improved multiple point recording instrument with an improved printing means for printing trace identifying marks and which includes a switching means for selectively adjusting the frequency of printing the trace identifying marks.

Still another object of the present invention is to provide an improved multiple point recording instrument which is capable of compact construction for narrow chart recorders as well as for wider chart recorders.

Yet still another object of the present invention is to provide an improved control system for a multiple point recording instrument.

It is further another object of the present invention to provide an improved multiple point recording instrument as set forth which includes improved means for color coding the trace records and the trace identifying marks.

In accomplishing these and other objects, there has been provided in accordance with the present invention, a multiple point recording instrument comprising printing means having first and second print members which are electrically actuated to print record trace marks and trace identifying marks, respectively, on a record member. A selective printing switch means is provided whereby the selection of input points to be processed may be programmed electrically even during recorder operation. Additional switching means are provided to control the frequency, relative to the record trace marks, at which identifying marks are printed to identify the several

2 record traces. The traces are printed in a plurality of colored inks by use of a printing ribbon having a plurality of longitudinal and parallel color bands. Means are provided for sequentially adjusting the position of the ribbon so that successive trace marks are of different colors.

A better understanding of the invention may be had from the following detailed description when read in connection with the accompanying drawings in which.

Figure 1:
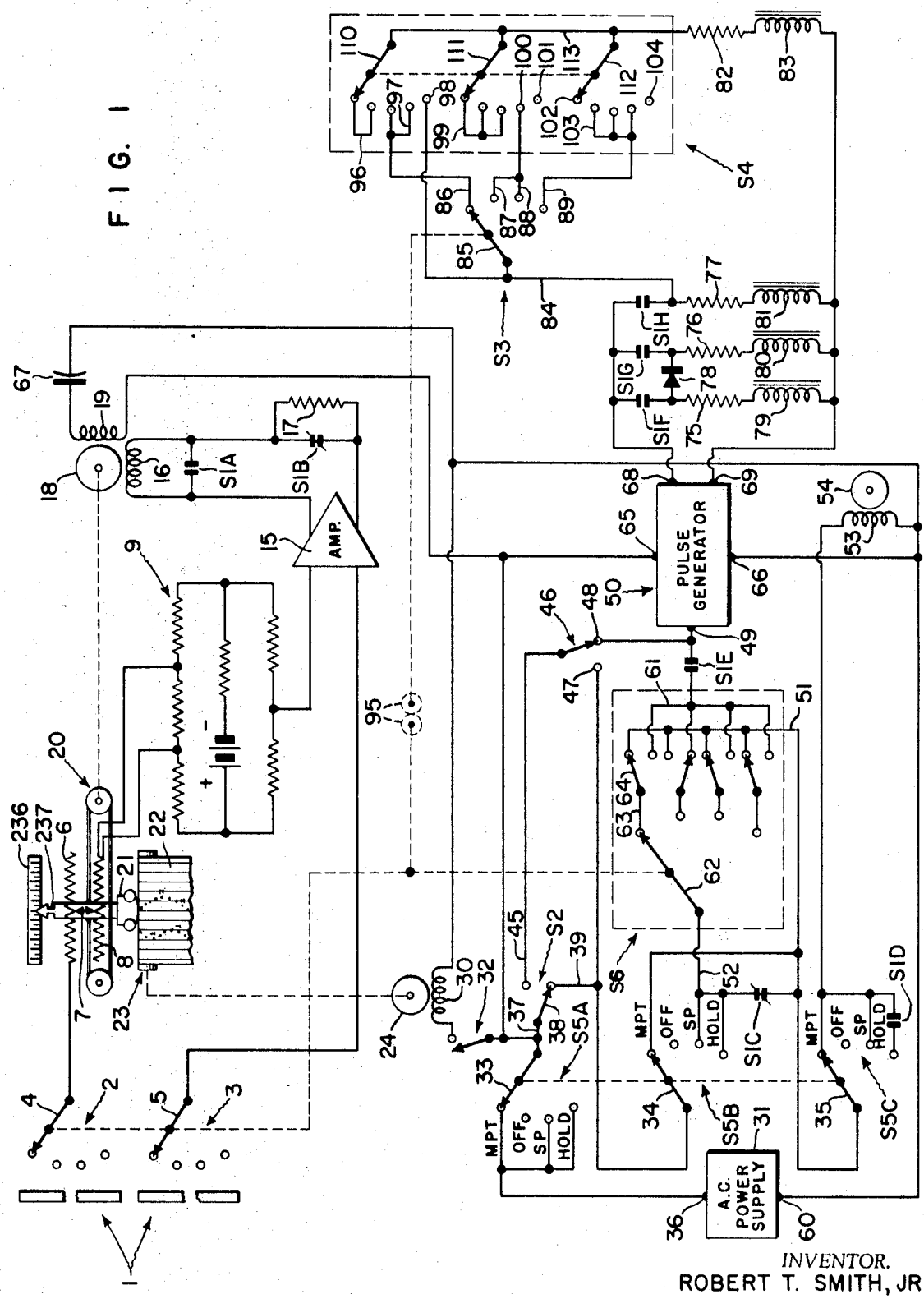
FIG. 1 is a circuit diagram of a multiple point recording instrument according to the present invention.

Referring now to the drawings in more detail, there is shown in FIG. 1 a terminal board 1. The terminal board 1 comprises a plurality of input terminal pairs, each pair having terminals 2 and 3. Twenty-four input pairs to provide 24 input channels were used in recording instrument constructed in accordance with the present invention. Selectively, each pair of terminals 2 and 3 are sequentially scanned and sensed by ganged movable contacts 4 and 5, respectively. The movable contact 4, in turn, is connected through a slidewire resistor 6, a slidewire contactor 7, a slidewire resistor 8 and a measuring circuit 9 to a first of two input terminals of an amplifier 15. The second input terminal of the amplifier 15 is connected to the movable contact 5.

Connected across output terminals of the amplifier 15 is a load comprising an inductive coil 16 connected in series with a resistor 17. Switches S1A and S1B are connected in parallel, respectively, with the coil 16 and the resistor 17. The coil 16 is the control winding of a servomotor 18. A reference winding 19 of the motor 18 is connected to an AC power supply. The motor 18 is coupled through a linkage 20 to a movable printing carriage 21. Mounted on the carriage 21 is the slidewire contactor 7.

The printing carriage 21 is positioned over a record member 22 and carries first and second printing means comprising a trace marker and a trace identifying marker, respectively. The respective printing means, whose detailed operation and construction are described at a later point in the specification, are operative when actuated to print upon the record member 22 a plurality of record traces, with identifying marks, to correspond to the several input signals sensed and recorded. FIG. 1 shows two exemplary record traces printed on the record member 22, the traces having trace marks in the form of dots and trace identifying marks in the form of numerals.

The record member 22 is a strip-type recording chart and is coupled by driving means 23 to a chart drive motor 24. A winding 30 of the motor 24 is connected across an AC power supply 31 through a four-position selector switch S5A and an OFF-ON switch 32. The switch S5A, along with selector switches S5B and S5C, comprise a rotary switching means S5, whose function is discussed at a later point in detail. The switches S5A, S5B and S5C each include a set of fixed contacts representing four switching positions and correspondingly labeled MPT, OFF, SP and HOLD and a movable contact 33, 34 and 35, respectively. The movable contacts 33, 34 and 35 are ganged for coordinate switching action.

In the switch S5A, the fixed contacts labeled MPT, SP and HOLD are connected to a terminal 36 of the power supply 31. The fixed contacts labeled OFF of the switches S5A, S5B and S5C are dummy contacts. The movable contact 33 is connected to a fixed contact 37 of a rotary switching means S2. A movable contact 38 of the switching means S2 connects the fixed contact 37 to either a fixed contact 39 or 45. The fixed contact 45 is connected to a movable contactor of a pressure sensitive switch 46, such as those marketed under the Trademark MICROSWITCH. The switch 46 has fixed contacts 47 and 48 which are connected, respectively, to the fixed contact 39 and a terminal 49 of a pulse generator 50. The contact 39 is connected to the movable contact 34 of the switch S5B.

Considering the switch S5B, the fixed contact MPT is connected to a conducting element 51. The fixed contacts SP and HOLD are connected directly to a conducting element 52 and through a switch S1C to the conducting element 51. The conducting element 51, in turn, is connected to the movable contact 35 of the switch S5C. The fixed contacts MPT and SP of the switch S5C are connected directly to a first terminal of a winding 53 of a timing motor 54. The fixed contact HOLD of the switch S5C is connected through a switch S1D to the first terminal of the winding 53. The second terminal of the winding 53 is returned to a terminal 60 of the power supply 31.

A switching means or multiple-channel switch S6 shown enclosed in dotted lines in FIG. 1 serves to selectively connect the conducting element 52 to a conducting element 61 or the conducting element 51. The switching means S6 includes a movable contact or contact bridge 62 and a plurality of fixed contacts or contact elements 63. Further switching means or contactors 64 are provided and included in the switching means S6 whereby each of the fixed contacts 63 may be selectively connected to either of the two conducting elements 51 or 61. The construction and function of the switching means S6 is explained later in this specification. The conducting element 52 is connected sequentially to one of the several fixed contacts 63 by the movable contact 62 and the contact 62 is ganged with the movable contacts 4 and 5 for coordinate action. The number of the fixed contacts 63 is selected to correspond to the number of the pairs of input terminals 2 and 3. The conducting element 61 is connected to the terminal 49 of the pulse generator 50 through a switch S1E.

Power is supplied to the pulse generator 50 at terminal 65 and 66. The terminals 65 and 66 are connected, respectively, to the movable contact 33 and the terminal 60 of the AC power supply 31. Connected in parallel with the pulse generator 50, between the contact 33 and the terminal 60 is the reference coil 19 connected in series with a phase-shift capacitor 67. In this manner power is supplied to the servo motor 18.

The pulse generator 50 has two output terminals 68 and 69. Connected to the terminal 68 is one terminal of switches S1F, S1G and S1H. The second terminal of the switches S1F, S1G and S1H are connected to resistors 75, 76 and 77, respectively. Additionally, the second terminals of the switches S1F and S1G are interconnected by a diode 78. The resistors 75, 76 and 77, in turn, are connected through solenoids 79, 80 and 81, respectively, to the terminal 69.

Switching means S3 and S4 serve to selectively connect the second terminal of the switch S1H to a resistor 82. The resistor 82, in turn, is connected through a solenoid 83 to the generator output terminal 69. The switching means S3 comprises a conducting element 84, a movable contact 85, and fixed contacts 86, 87, 88 and 89. The movable contact 85 is connected by gear means 95 to the ganged movable contacts 4, 5 and 62.

The switching means S4, shown enclosed in dotted lines, comprises fixed contacts 96, 97, 98, 99, 100, 101, 102, 103 and 104, movable contacts 110, 111 and 112, and a conducting element 113. The contacts 110, 111 and 112 are each movable to five switching positions. The five switching positions associated with the movable contact 110 include the fixed contacts 96, 97, and 98, the contacts 96 and 97 each representing two switching positions. The five switching positions associated with the movable contact 111 include the fixed contacts 99, 100 and 101, the contact 99 representing three switching positions. Similarly, the five switching positions associated with the movable contact 112 include the fixed contacts 102, 103 and 104 with the contact 103 representing three switching positions. The movable contacts 110, 111 and 112 are ganged for coordinate switching action and serve to selectively connect those fixed contacts associated with a selected switching position to the conducting element 113. The conducting element 113, in turn, is connected to the resistor 82. The switching means S3 and S4 are so interconnected that the fixed contacts 86, 87 and 89 are connected to fixed contacts 97, 100 and 103, respectively. Additionally, the fixed contact 88 is also connected to the fixed contact 100. The fixed contact 98 is connected directly to the conducting element 84. The fixed contacts 96, 99, 101, 102 and 104 of the switching means S4 are dummy contacts.

Figure 2:
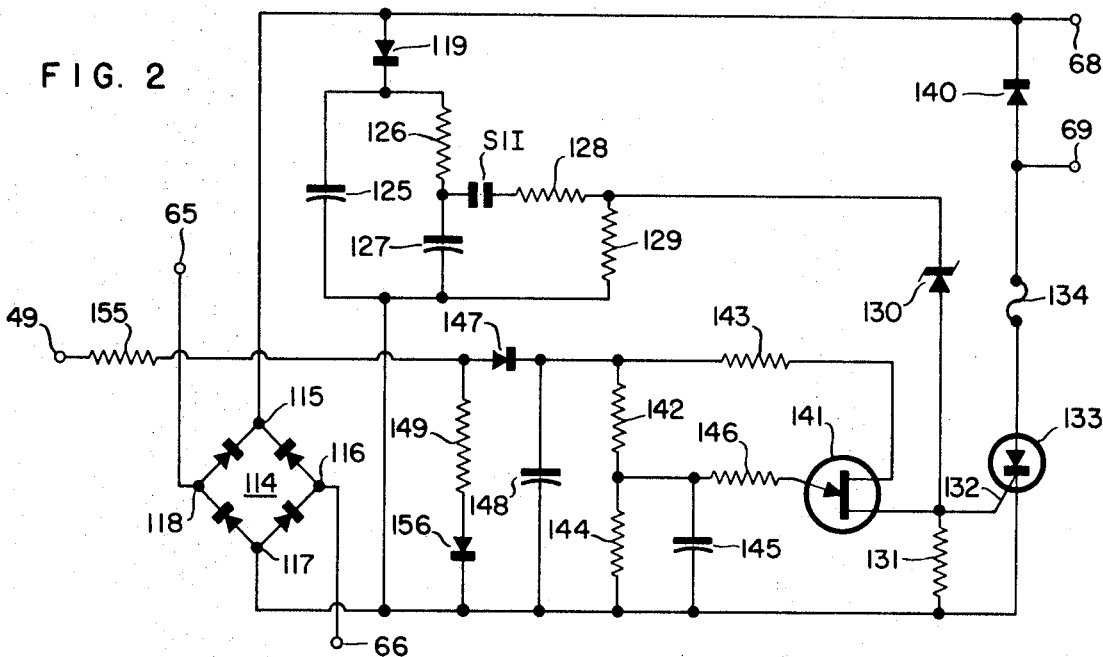
FIG. 2 is a circuit diagram of the pulse generator shown as a block in FIG. 1.

Referring now to FIG. 2, the pulse generator 50 includes a diode bridge 114 having clockwise numbered terminals 115, 116, 117 and 118. The generator terminals 68, 66 and 65 are connected, respectively, to the bridge terminals 115, 116 and 118. Connected to the terminal 115 is a diode 119. The diode 119 is connected by a capacitor 125 to the bridge terminal 117. Connected to the junction between the diode 119 and the capacitor 125 is a resistor 126. The resistor 126 is connected through a capacitor 127 to the terminal 117. The junction between the resistor 126 and the capacitor 127 is connected through a switch S11 to a resistor 128. The resistor 128 is connected by a resistor 129 to the terminal 117. The junction between the resistors 128 and 129 is connected to a Zener diode 130, and the Zener diode 130 is connected to the terminal 117 by a resistor 131. The junction between the Zener diode 130 and the resistor 131 is connected to the control electrode 132 of a silicon control rectifier 133. The control rectifier 133 is connected from the terminal 117 through a fuze 134 to the output terminal 69. Connected between the output terminals 68 and 69 is a diode 140.

Also connected to the junction of the Zener diode 130 and the resistor 131 is one base electrode of a unijunction transistor 141. The second base electrode of the unijunction 141 is connected to a resistor 142 by a resistor 143. The resistor 142 is connected to the bridge terminal 117 by the combination of a resistor 144 and a capacitor 145 connected in parallel. The emitter electrode of the unijunction 141 is connected to the junction between the resistors 142 and 144 by means of a resistor 146.

The junction between the resistors 142 and 143 is connected to a junction between a diode 147 and a capacitor 148. The capacitor 148 is connected to the terminal 117. The diode 147 is connected to the junction of a resistor 149 and a resistor 155. The resistor 149 is connected by a diode 156 to the terminal 117, and the resistor 155 is connected to the generator terminal 49.

Figure 3:
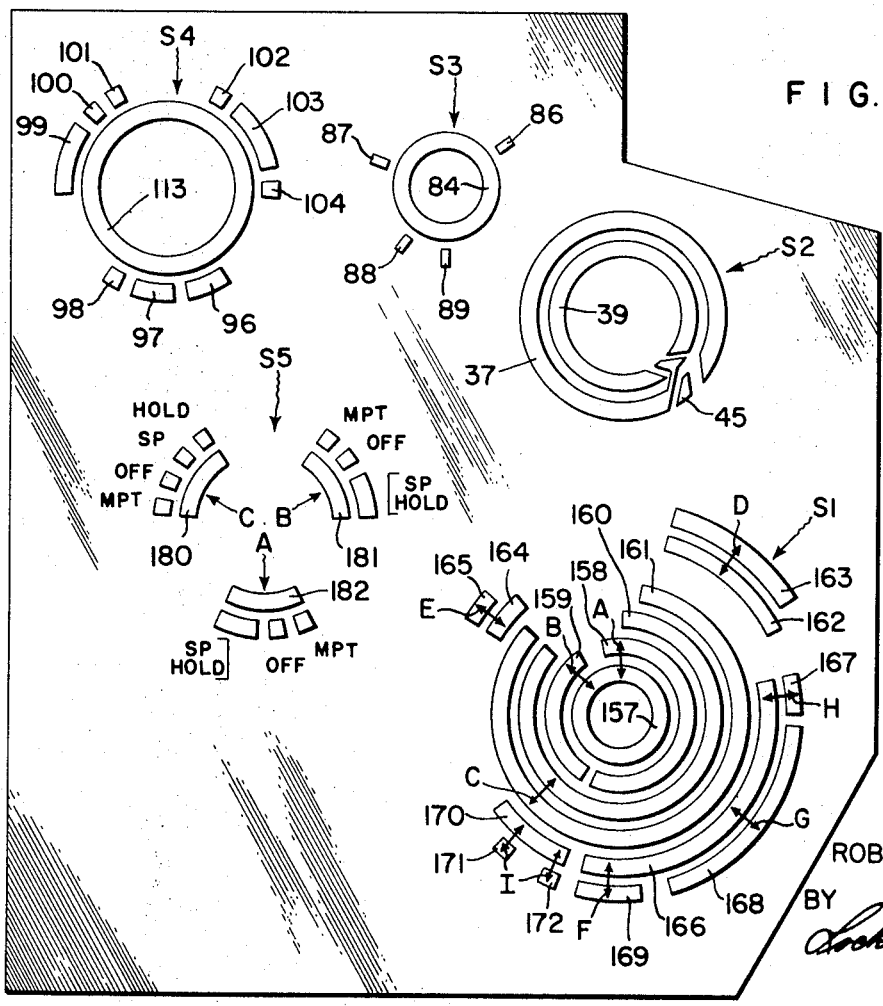
FIG. 3 is a pictorial representation of the fixed contacts of certain of the electrical switching means of FIGS. 1 and 2

FIG. 3 shows one arrangement of switching means used in the exemplary recorder. In that exemplary model, a plurality of fixed contacts were provided by conductive elements on a printed circuit board. The various switching means shown in FIG. 3 are referred to by the designations S1, S2, S3, S4 and S5 of which the switching means S2 through S5 were previously introduced in the discussion of FIG. 1. Turning to a consideration of the switching means S1, fixed contacts 157 through 172 are associate therewith. The contacts 158 through 172 are circularly arcuate conducting segments and are arranged in a circular array about a conducting ring, the conducting ring being the contact 157. These contacts provide the fixed contacts for the switches S1A, S1B, S1C, S1D, S1E, S1F, S1G, S1H and S1I, which switches were identified in connection with the description of FIGS. 1 and 2.

Associated with the switch S1A are the fixed contacts 157 and 158. The conducting ring 157 with the conducting segment 159 provide the fixed contacts for the switch S1B. The switch S1C has the fixed contacts 160 and 161 and the switch S1D has as fixed contacts the conducting segments 162 and 163. The conducting segments 164 and 165 provide the fixed contacts for the switch S1E. Associated with the switch S1F are fixed contacts 166 and 169. The conducting segment 166 acts also as a fixed contact for the switch S1G and for the switch S1H. The second fixed contact of the switch S1G is provided by the conducting segment 168. The conducting segment 167 provides the second fixed contact for the switch S1H. The switch S1I is comprised of the fixed contacts 170, 171 and 172, and the contacts 171 and 172 are connected to a common point in the circuitry of the exemplary recorder.

Considering the switching means S2, the fixed contact 39 included therein is an open conducting ring. By the terminology open conducting ring as used in this specification, it is meant a circular conducting element forming a substantially complete circle with a gap of predetermined angular width therein. Concentric with and surrounding the contact 39 is the fixed contact 37. The contact 37 is an open conducting ring, having a gap in its periphery positioned to correspond with the gap in the contact 39, and having an extension adapted to fit within the gap of the contact 39, but to remain electrically isolated therefrom. Located within the gap of the contact 37 is a fixed contact 45. The contact 45 is electrically isolated from the contact 39. In the exemplary recorder, the angular width of the gaps in the contacts 37 and 39 were designed to correspond to that angular distance occupied by one input channel. The function of this specific design of the switching means S2 is explained later in the specification.

The switching means S3 is a rotary switching means and has fixed contacts 84, 86, 87, 88 and 89. The contacts 86 through 89 are contact pads and are spaced at predetermined points around a conducting ring. The conducting ring is the fixed contact 84. The switching means S4 and S5 are each three pole rotary selector switches. The switching means S4 has the fixed contacts 96 through 104 and the contact 113. The contacts 96 through 104 are contact pads and are spaced in three distinct groups about the contact 113, as previously explained. The fixed contact 113 is a circular conducting ring. The switching means S5 has three distinct switching sections, switches S5A, S5B and S5C. The switch S5C has as fixed contacts a circularly arcuate conducting segment 180 and four associated contact pads representing the switching positions MPT, OFF, SP and HOLD. Similarily, the switches S5B and S5A have circularly arcuate conducting segments 181 and 182, respectively. In both switches S5B and S5A, the switching positions MPT and OFF are provided by distinct contact pads, and the switching positions SP and HOLD are provided by a common single contact pad.

Figure 4A:
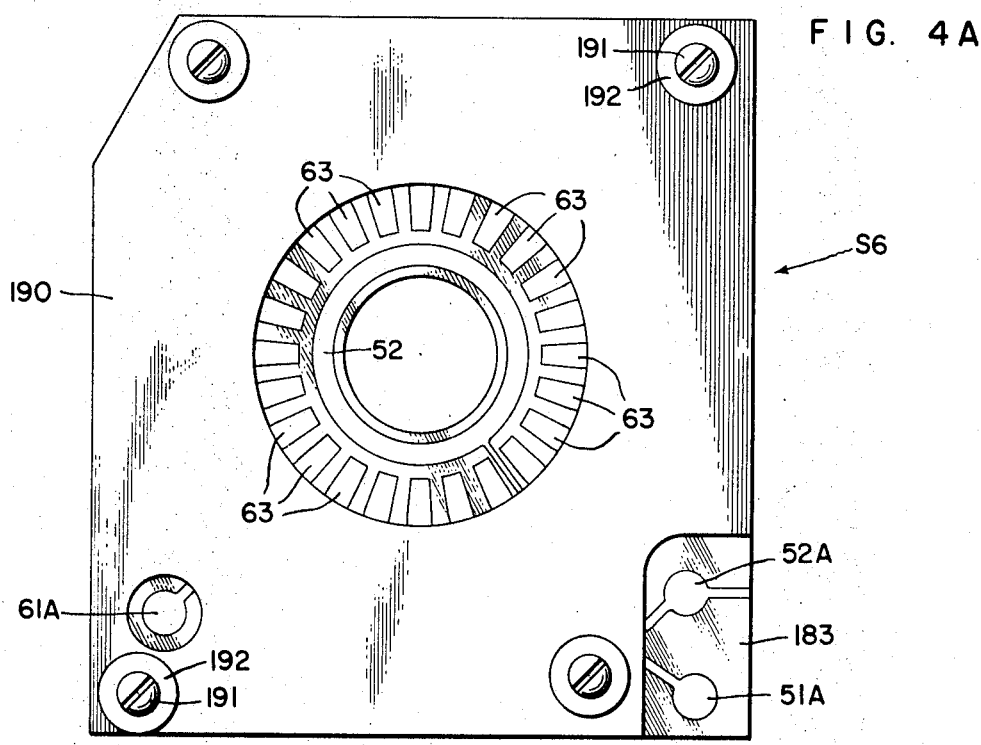
FIGS. 4A and 4B are pictorial representations of a selection switching means shown schematically in FIG. 1.
Figure 4B:
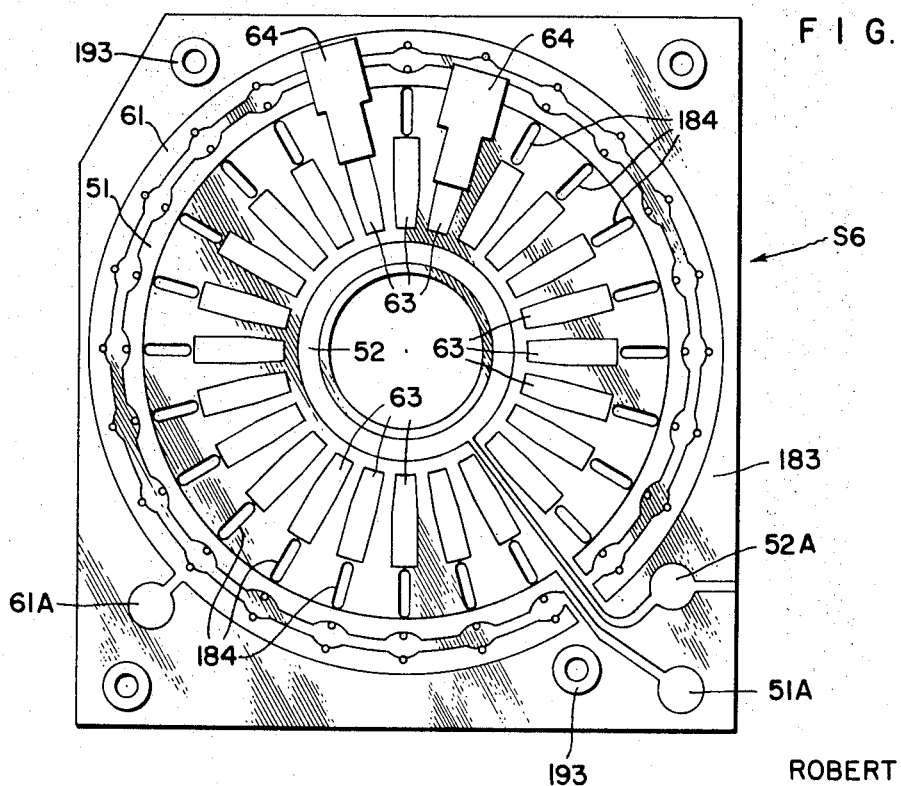

Shown in FIG. 4A and 4B is one arrangement of the switching means S6, such as was used in the exemplary recorder. A plurality of fixed contacts were provided by conducting elements formed on a circuit board 183 in accordance with well known printed circuit techniques. The fixed contacts include the conducting elements 51, 52 and 61, and the plurality of fixed contacts 63. The conducting element 52 is a closed circular conducting ring and the contacts 63 are radially disposed about the ring 52. The contacts 63 are conducting segments, there being 24 segments to correspond with the 24 input channels in the exemplary recorder. The fixed contacts 63 are substantially enclosed by the conducting elements 51, and 61, which elements are each open conducting rings concentric with the conducting ring 52. The elements 51 and 61 each have corresponding gaps in their peripheries to allow contact pads or terminal means 52A and 51A to be connected by conducting strips to the conducting elements 52 and 51, respectively. A contact pad or terminal means 61A is also connected to the conducting element 61. These pads 51A, 52A and 61A provide convenient points for connecting the switching means S6 into external circuitry.

Figure 5:
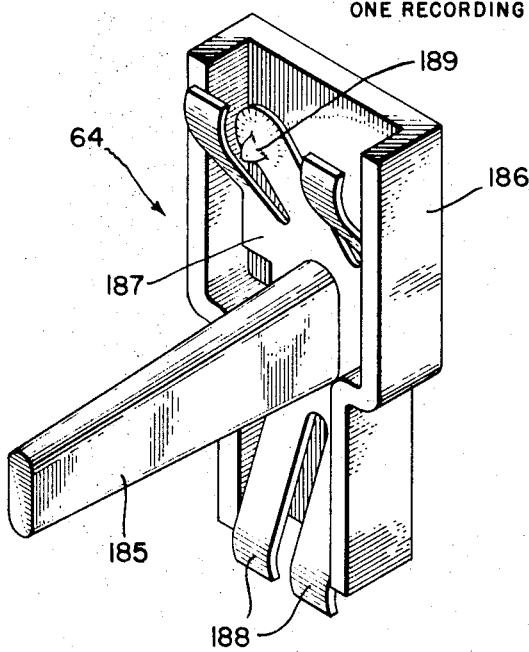
FIG. 5 is a perspective view of a movable contactor means of the switching means shown in FIG. 4B.

Cutouts or apertures 184 are cut through the circuit board 183 between each of the several fixed contacts 63 and the conducting element 51. Each cutout 184 is shaped to accept and define a limited path of movement for a shank or projection 185, the shank 185 being part of the switching means 64 as shown in FIG. 5. The shank 185 is of sufficient length to extend through and project beyond the surface of the board 183. In addition to the shank 185, each switching means 64 includes a foot 186 and a conducting element or longitudinal conductor 187. The shank 185 and the foot 186 comprise a shoe of insulative material. The conductive element 187 is adapted to fit around the shank 185 and within the foot 186. The element 187 is formed to have its ends 188 and 189 bent away from the foot 186. The switching means or contactors 64 are positioned on the switching means S6 by inserting the several shanks 185 into the respective cutouts 184. When properly positioned, the feet 186 of the switching means 64 will hold the respective conducting element ends 188 in contact with their corresponding fixed contacts 63. The several switching means 64 may be then moved individually to bring their respective conducting element ends 189 in contact with either the conducting element 51 or 61. A plate 190, shown in FIG. 4A, is mounted parallel to the circuit board 183 by means of four screws 191 and associated washers 192. The screws 191 are screwed into the mounting posts 193, which posts 193 are fixed to the circuit board 183. The plate 190 presses against the feet 186 of the switching means or contactors 64, holding the contactors 64 in movable cooperative association with the board 183, and the board's contacts 63 and conducting elements 51 and 61. When the switching means S6 is placed in situ in the exemplary recorder, as in FIG. 6, the plate 190 acting as the holding means is located below the board 183 and is, thus, concealed from view. It is noted that the shape of the plate 190 is constructed so that the contact pads 51A, 52A and 61A may be connected to external circuitry. Further, a circular opening is cut in the center of the plate 190, exposing the conducting element 52 and the contacts 63, in order to accommodate the contact bridge 62 which is used with the switching means S6.

Figure 6:
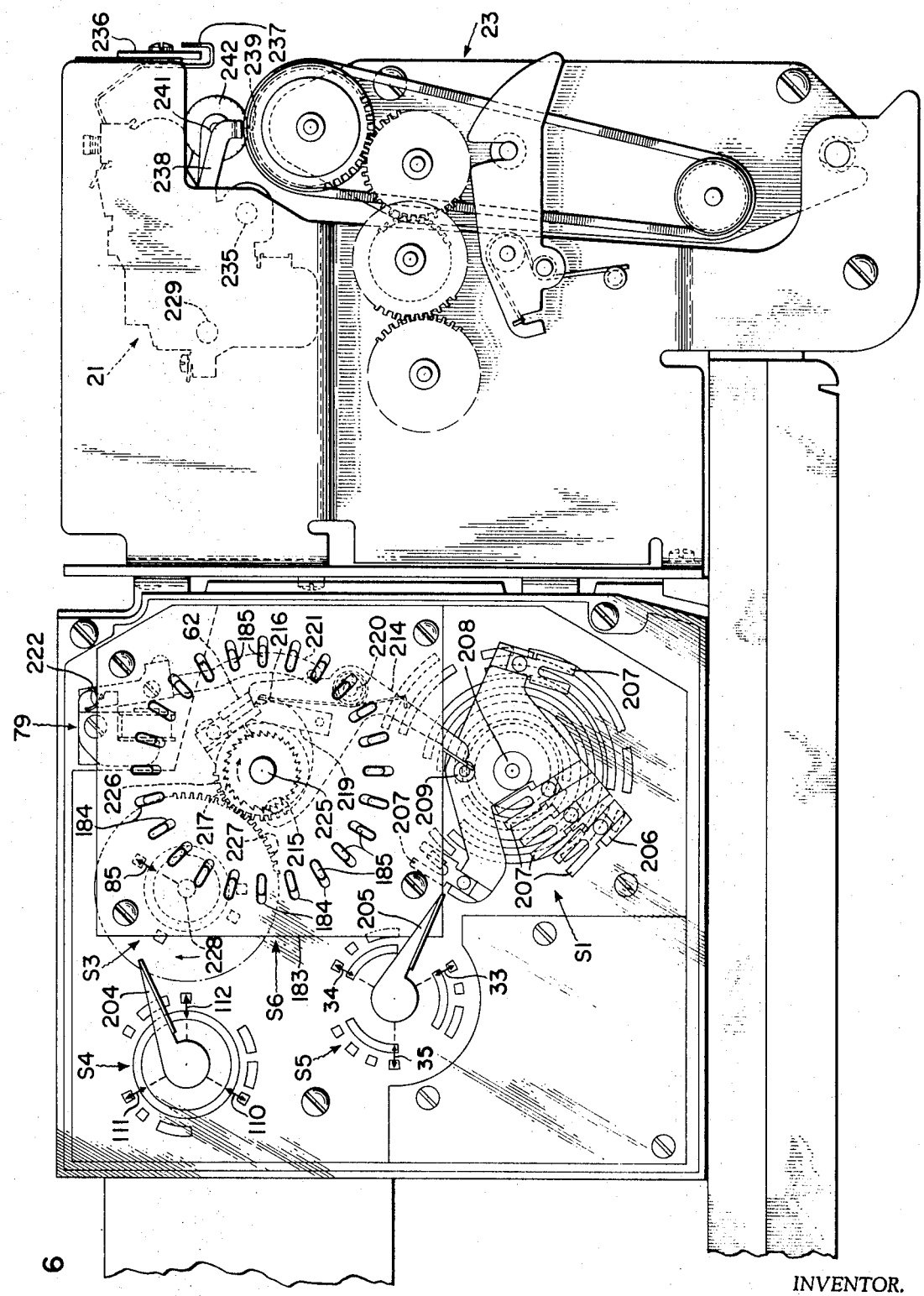
FIG. 6 is a fragmentary side view of the recording instrument according to the present invention.

In FIG. 6, the switching means S1, S3, S4, S5 and S6 are shown in situ in the exemplary recorder. Switch handles 204 and 205 are associated with the switching means S4 and S5, respectively. The handle 204 is connected to the ganged movable contacts 110, 111 and 112 (shown by arrowheads). Similarily, the handle 205 is connected to the ganged movable contacts 33, 34, and 35 (shown by arrowheads). Mounted over the fixed contacts of the switching means S1 is a rotor 206. The rotor 206 carries five movable contacts 207 and is fixed to a shaft 208. The shaft 208 runs through the center of the switching means S1 and is driven through suitable gear means by the timing motor 54. As the rotor 206 rotates, the several contacts 207 close in a timed sequence those of the switches S1A through S1I with which each contact 207 is associated. The specific switch or switches closed by the individual contacts 207 are predetermined by the positioning of the contacts 207 on the rotor 206. The timed relationship used in the exemplary recorder for the switches S1A through S1I shown in FIG. 13 and will be discussed in connection with that figure.

Additionally, a pin 209 is mounted on the rotor 206. One during each rotation of the rotor 206, the pin 209 engages and actuates one end of a pawl 214. On the opposite end of the pawl 214 are detents 215 and 216. The detent 215 is held normally in engagement with a gear wheel 217 by a spring 218 to prevent the wheel 217 from turning. Pivotably fixed to the pawl 214 is a pawl 219. The pawl 219 is held in engagement with the gear wheel 217 by the spring 218. The pawl 214, when actuated, rocks about a pivot point 220. This rocking motion of the pawl 214, disengages the detent 215 from the gear wheel 217 and pulls downward the pawl 219. The pawl 219, thereby, turns the wheel 217, as illustrated, clockwise until the rocking motion of the pawl 214 brings the detent 216 into engagement with the wheel 217. The detent 216 stops the rotation of the gear wheel 217. In the exemplary recorder, the gear wheel 21 has 24 teeth and is rotated one twenty-fourth of a rotation as a result of each actuation of the pawl 214. Upon completion of the actuation of the pawl 214, the spring 218 rocks the pawl 214 back to its normal position in which the detent 215 engages the wheel 217 and the detent 216 is disengaged therefrom. During this return rocking motion, the pawl 219 is forced upward to engage the next higher gear tooth on the wheel 217. The pawl 214 may also be actuated by an arm 221. The arm 221 is attached to the solenoid 79. Energization of the solenoid 79 actuates the arm 221 which in turn actuates the pawl 214. Upon deenergization of the solenoid 79, the arm 221 is returned to its unactivated position by a spring 222.

The gear wheel 217 is fixed on a shaft 225. Shown mounted on the shaft 225 are the movable contact 62 of the switching means S6 and a gear wheel 226. Additionally, mounted on the shaft 225, but not shown in FIG 6, are the movable contacts 4, 5 and 38. By means of the shaft 225, the movable contacts 4, 5, 38 and 62 are all conjoined for coordinate rotary action. The gear wheel 226 engages a gear wheel 227. The gear wheel 227 is fixed to a shaft 228 and the shaft 228 is positioned on the center axis of the switching means S3. The shaft 228 carries the movable contact 85 (shown by arrowheads) of the switching means S3. In the exemplary recorder the gear wheels 217, 226 and 227 comprise the gear means 95 of FIG. 1 and have 24, 48, and 98 teeth, respectively. This gearing arrangement provides an effective gear ratio of 24 : 49 between the wheels 217 and 227. Remembering that one actuation of the pawl 214 advances the gear wheel 217 one twenty-fourth of a rotation, it is consequently then necessary to actuate the pawl 214, 49 times to cause on rotation of the shaft 228, as will be explained in more detail hereinafter.

Figure 7:
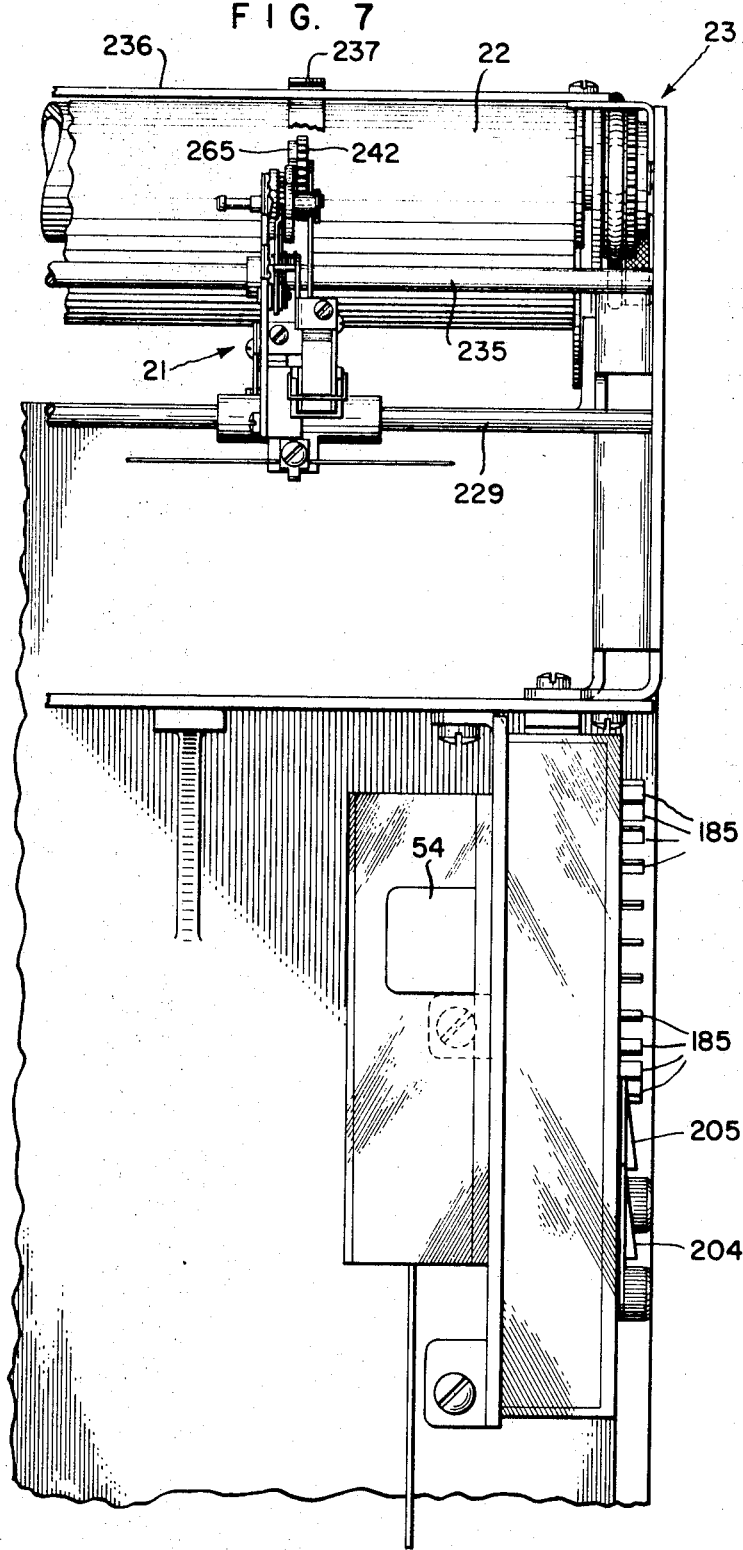
FIG. 7 is a fragmentary top view of the recording instrument according to the present invention.

FIGS. 6 and 7 show the printing carriage 21 slidably mounted on parallel bearing surfaces 229 and 235. A scale 236 is secured on the frame of the exemplary recorder adjacent to the carriage 21 and parallel with the bearing surface 229 and 235. A pointer 237 is attached to the carriage 21 to move near to and parallel with the scale 236. The pointer 237, in conjunction with the scale 236, provides a visual indication of the lateral position of the printing means 21.

Figure 8:
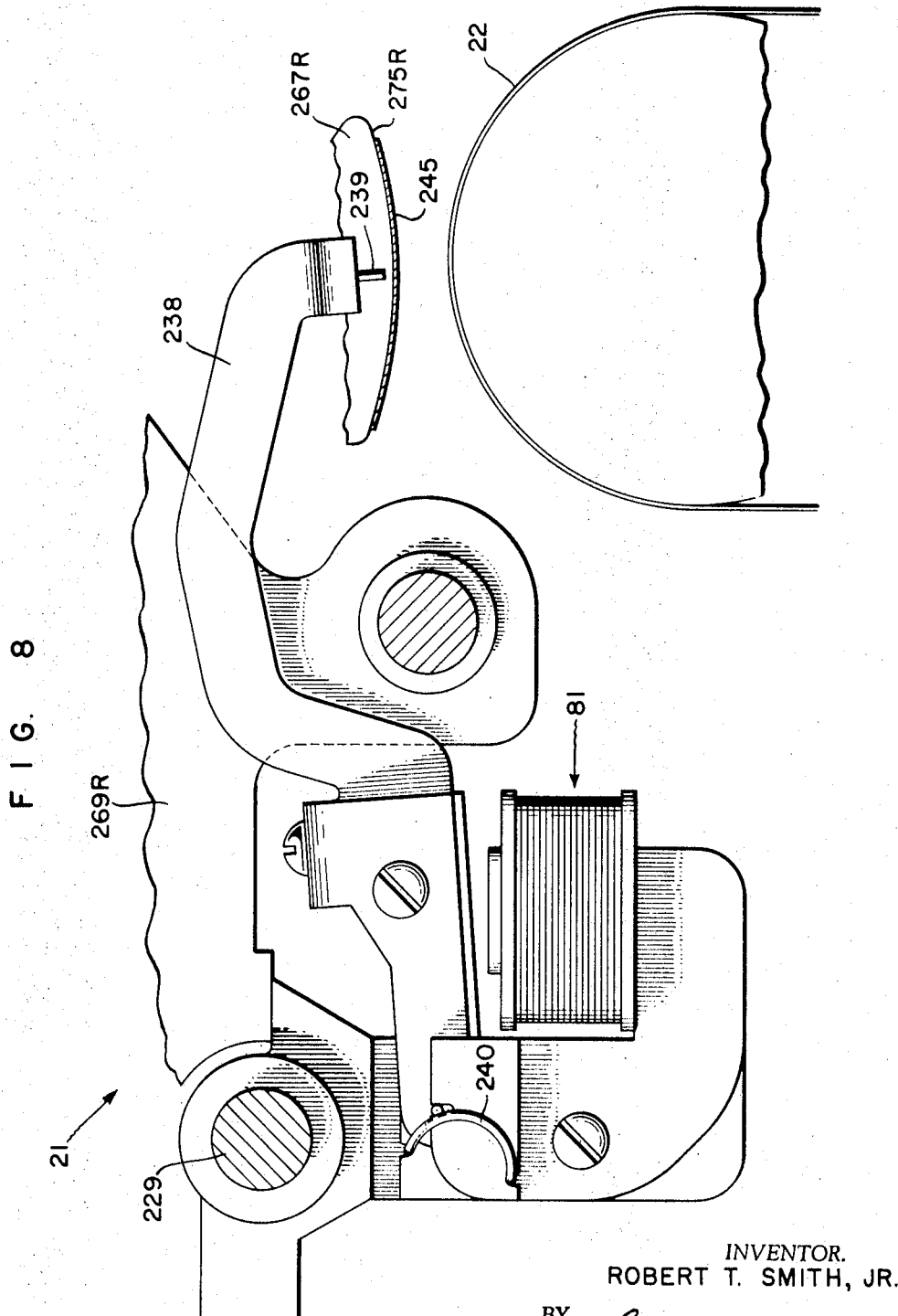
FIG. 8 is a side view of the mechanism of one printing means, such as a trace marker, constructed in accordance with the present invention.
Figure 9:
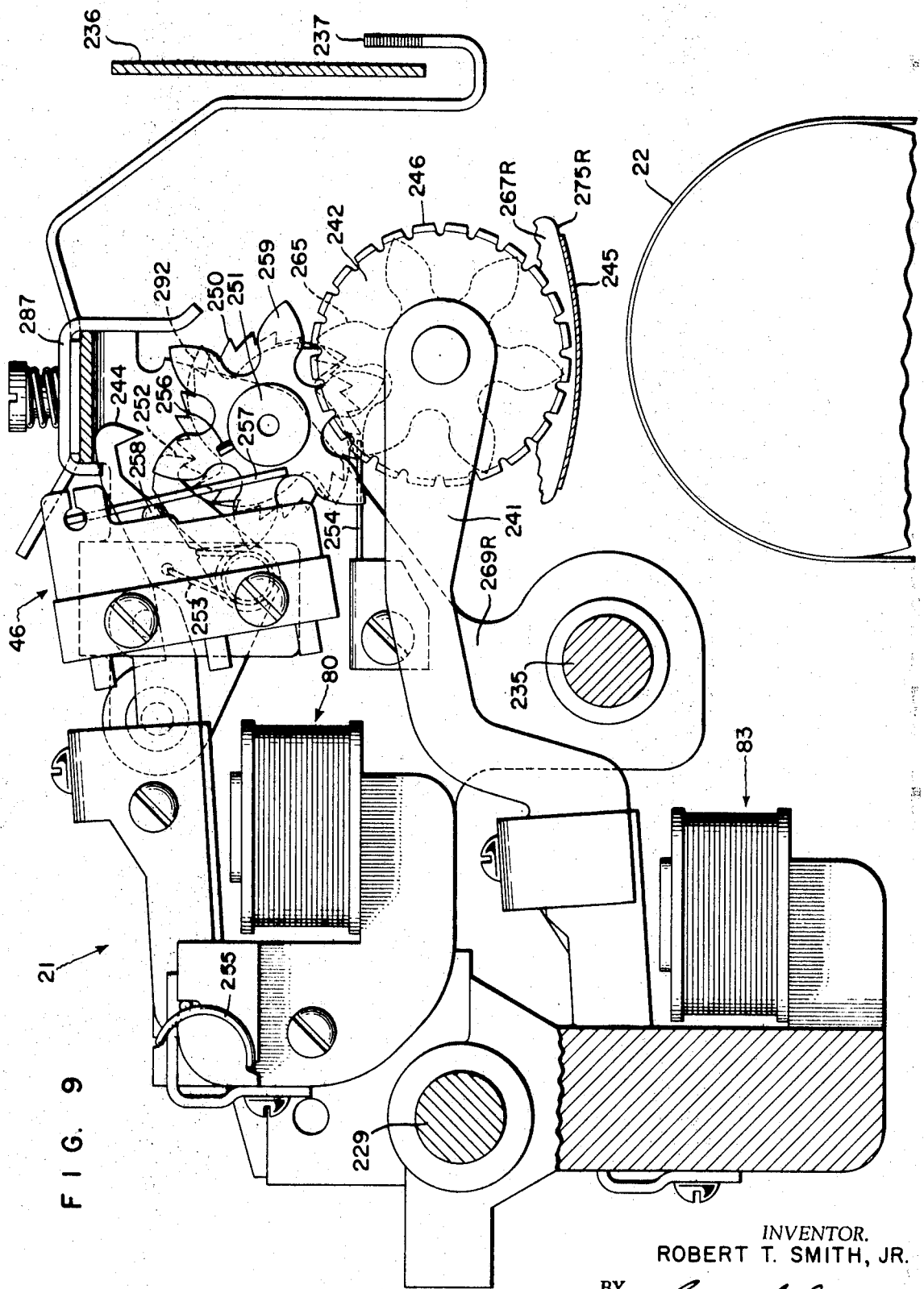
FIG. 9 is a side view of the mechanism of a second printing means, such as a trace identifying marker, constructed in accordance with the present invention.

The printing carriage 21, shown in phantom in FIG. 6, is shown on an enlarged scale and in greater detail in FIGS. 8 and 9. In FIG. 8 there is shown the solenoid 81 mounted on a section of the printing carriage 21. An arm 238 with a print element 239 on its tip is attached to the solenoid 81. Shown positioned between the print element 239 and the record member 22 is a section of a printing ribbon 245. A spring 240 biases the arm 238 so that the print element 239 is normally held out of contact with the printing ribbon 245. Energization of the solenoid 81 actuates the arm 238, which causes the print element 239 by means of the printing ribbon 245 to print a trace mark, such as a dot, on the record member 22.

In FIG. 9 the solenoid 83 is shown mounted on the printing carriage 21. Attached to the solenoid 83 is an arm 241 with a print element 242 on its tip. The print element 242 is an indexable print wheel having trace identifying characters or channel indicia 246 thereon. In the exemplary recorder, the print wheel 242 had 24 trace identifying characters, such as numerals. Shown positioned between the print element 242 and the record member 22 is a section of the printing ribbon 245. A spring (not shown) biases the arm 241 so that the print wheel 242 is normally held out of contact with the printing ribbon 245. Energization of the solenoid 83 actuates the arm 241, which causes the print wheel 242 by means of the printing ribbon 245 to print a selected trace identifying mark on the record member 22. The trace identifying mark selected and printed is determined by indexing the print wheel 242, as is explained hereinafter.

FIG. 9 also shows the solenoid 80 mounted on the printing carriage 21. A follower pawl 244 is pivotably attached to the solenoid 80. The pawl 244 is held normally out of engagement with a rachet wheel 250 by a spring 253. The rachet wheel 250 is mounted on a shaft 251. A pawl 252 is pivotably mounted on the follower pawl 244. The spring 253 holds the pawl 252 in engagement with the wheel 250. Energization of the solenoid 80 actuates the pawls 244 and 252, and the pawl 252, in turn, steps the rachet wheel 250 in a counterclockwise direction, as illustrated in the drawing. In the exemplary recorder, the rachet wheel 250 has 24 teeth and is advanced one twenty-fourth of a rotation upon each actuation of the pawl 252. The spring loaded follower pawl 244 upon actuation rocks into contact with the rachet wheel 250 to prevent the wheel 250 from rotating, due to angular momentum, beyond the desired one twenty-fourth of a revolution. A detent 254 fixed to the frame of the carriage 21 prevents the rachet wheel 250 from rotating in the clockwise direction. Upon deenergization of the solenoid 80, a spring 255 returns the solenoid 80 to its deenergized position, the pawl 252 being stepped to engage the next higher gear tooth of the wheel 250.

Shown in FIG. 9, projecting from the shaft 251 is a pin 256. As the rachet wheel 250 is stepped in the counterclockwise direction, as illustrated in the drawing, once during each rotation of the shaft 251, the pin 256 is brought in contact with and depresses an arm 257. The arm 257 is part of the pressure sensitive switch 46 and rests in contact with a switch actuator 258. Depression of the arm 257 depresses the actuator 258 which, in turn, moves the movable contact of the switch 46 from the fixed contact 48, its normal position, to the fixed contact 47. Additionally, secured to the shaft 251 is a gear 259. The gear 259 engages and drives a matching gear 265. The gear 265 is fixed on the print wheel 242; thereby the print wheel 242 is advanced, i.e. indexed, one step or trace identifying character, each time the solenoid 80 is actuated.

Figure 10:
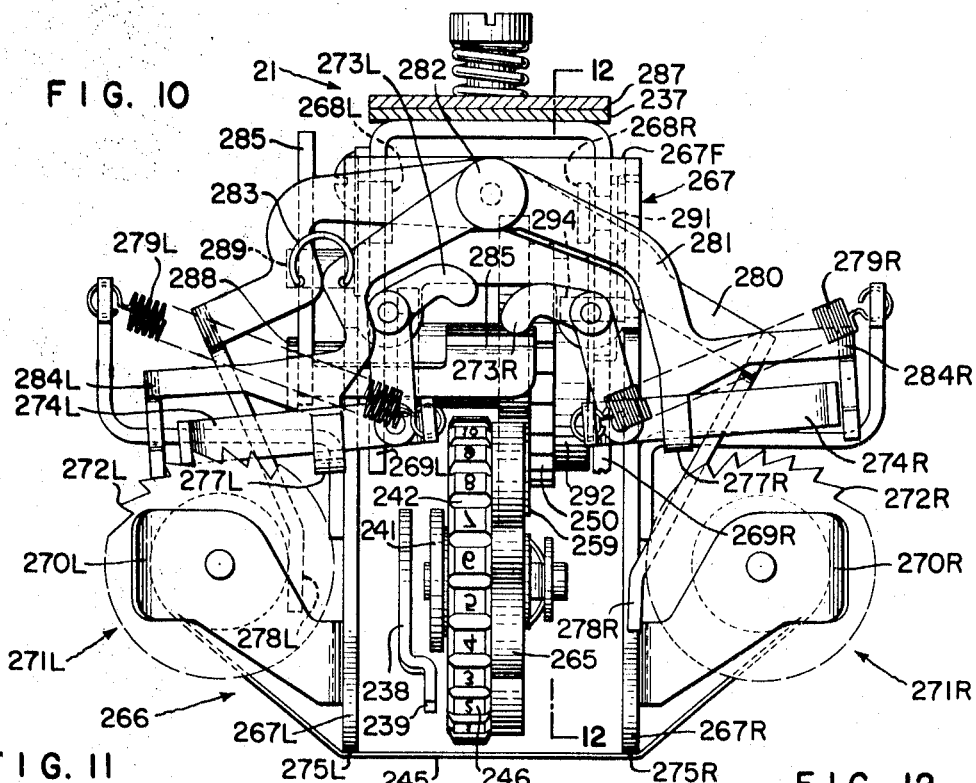
FIG. 10 is a pictorial representation of the printing means including ribbon carriage and ribbon advancing mechanism.

The printing ribbon 245, cross sections of which are included in the showing in FIGS. 8 and 9, is carried by a ribbon carriage 266. The carriage 266 is shown in FIG. 10 and includes a frame 267. The frame 267 is made of a single piece of light metal and has a front portion 267F extending between the upper ends of side portions 267L and 267R. The side portions 267L and 267R serve as guide members at points 275L and 275R to guide the printing ribbon 245 between the print elements 239 and 242 and the record member 22. The suffixes L and R, as here and hereafter used, designate, respectively, the left and right sides of the ribbon carriage 266, as illustrated by FIG. 10 viewed from above, the frame 267 appears substantially U-shaped in the vertical plane. A boss 268L is mounted on the inside face of the side portion 267L. Similarly, a boss 268R is mounted on the inside face of the side portion 267R. These bosses extend inwardly toward each other and are coaxial. Sides 269L and 269R of the printing carriage 21 are adapted to receive the bosses 268L and 268R, respectively, for pivotably mounting the carriage 266 on the carriage 21. The manner in which the printing carriage 21 is so adapted for pivotably mounting the ribbon carriage 266 will be explained in greater detail in connection with FIGS. 11 and 12. A U-shaped extension 270L is secured on the outside face of the side portion 267L. The extension 270L is made of spring metal and is adapted to receive a ribbon spool 271L between the arms thereof. A similar extension 270R, which is adapted to receive a ribbon spool 271R, is secured on the outside face of the side portion 267R. One end of each of the spools 271L and 271R are provided with rachet teeth 272L and 272R, respectively. The printing ribbon 245 is wound cooperatively upon the spools 271, and spools 271 are mounted in their associated extensions 270 so that the ribbon 245 runs between the spools 271L and 271R across the bottoms of the side portions 267.

Pivotably mounted on the left side of the front frame portion 267F is a bell crank 273L. The crank 273L is cooperatively associated with a pawl 274L. The pawl 274L functions to selectively engage the rachet teeth 272L to drive the spool 271L. In the same manner, a bell crank 273R is cooperatively associated with a pawl 274R to selectively drive the spool 271R. The pawl 274L is biased by a spring 279L while the pawl 274R is biased by a spring 279R. A pair of rocker arms 280 and 281 comprising toggle means are mounted to pivot about a pivot point 282. The point 282 is located on the vertical centerline of the front frame portion 267F. Downwardly extending from each side of the rocker arm 280 are feeler arms 278L and 278R, respectively. The feeler arms 278 serve, depending on the position of the arm 280, to selectively sense the thickness of the ribbon 245 wound on one or the other of the spools 271. The rocker arms 280 and 281 are connected by a spring 283. The spring 283 biases the arms 280 and 281 so that they overcenter with respect to each other to opposite sides of the pivot point 282. The rocker arm 281 has a pair of depending fingers 284L and 284R, adjacent to the pawls 274L and 274R, respectively. Each of the depending fingers 284 has a projection 277L and 277R, respectively, which underlays the associated pawls 274. These projections 277 serve, depending on the position of the arm 281, to selectively lift one or the other of the pawls 274, thereby preventing the lifted pawl 274 from engaging with its associated rachet 272.

In FIG. 10, the rocker arms 280 and 281 are shown overcentered to opposite sides of the carriage 266, as biased by the spring 283. The depending finger 284L is tilted downward and engages the rachet teeth 272L, thereby serving as a detent to prevent counterclockwise rotation of the spool 271L, as shown. At the same instant the feeler arm 278L is tilted upward to sense the thickness of the ribbon 245 wound onto the spool 271L. Actuation of the pawls 274 under these conditions results in the pawl 274L engaging the rachet teeth 272L while the pawl 274R is prevented from engaging the rachet teeth 272R by the lifting action of the projection 277R. The mechanism for simultaneously actuating the pawls 274 is described hereinafter. The printing ribbon 245 is, consequently, wound onto the ribbon spool 271L from the spool 271R. As the thickness of the ribbon 245 wound on the spool 271R increases, the feeler arm 278L is forced more and more towards the center of the carriage 266. This displacement of the feeler arm 278L continues until the rocker arm 280 becomes overcentered to the left, at which instant the feeler arm 278L will be shifted down out of contact with the ribbon 245 and the feeler arm 278R is shifted up to sense the thickness of the ribbon 245 wound onto the spool 271R. The reversal of tilt of the rocker arm 280 causes the rocker arm 281 to also reverse tilt, due to the action of the spring 283. The finger 284R of the arm 281 then engages the rachet teeth 272R, acting as a detent to prevent clockwise rotation of the spool 271R. Actuation of the pawls 274 now results in the pawl 274R engaging the rachet teeth 272R and the pawl 274L being prevented, by the projection 277L, from engaging the rachet teeth 272L. The printing ribbon 245 is, thus, wound onto the spool 271R from the spool 271L. A form of continuous printing ribbon 245 is, thereby, provided for the exemplary recorder wherein the ribbon 245 is periodically wound from one ribbon spool 271 to the other, and vice versa, with the direction the ribbon 245 is wound being reversed each time the tilt of the rocker arm 280 is shifted.

In the exemplary recorder, the printing ribbon 245 has six distinct longitudinal color bands impregnated with six different colored inks. By use of these color bands the trace and channel identifying marks representing the 24 input channels are sequentially color coded. To accomplish the color coding, the printing carriage 21 and the ribbon carriage 266 are so adapted that the ribbon carriage frame 267 may be sequentially tilted about an axis through the bosses 268 to shift the ribbon 245 to present a new color band to the printing elements 239 and 242. The carriages 21 and 266 are further adapted so that the tilt of the frame 267 also causes the bell cranks 273 to be actuated by a bell crank 285 to longitudinally advance the printing ribbon 245 in cycles of six incremental steps which correspond with the six increments of tilt movement. The increments of tilt movement of the frame 267 are synchronized with the scanning of input channels so that a different color band is presented to the printing elements 239 and 242 for each input channel. Since there are six color bands, the ribbon carriage frame 267 is restored to its initial position of minimum tilt after each six increments of tilt movement.

Figure 11:
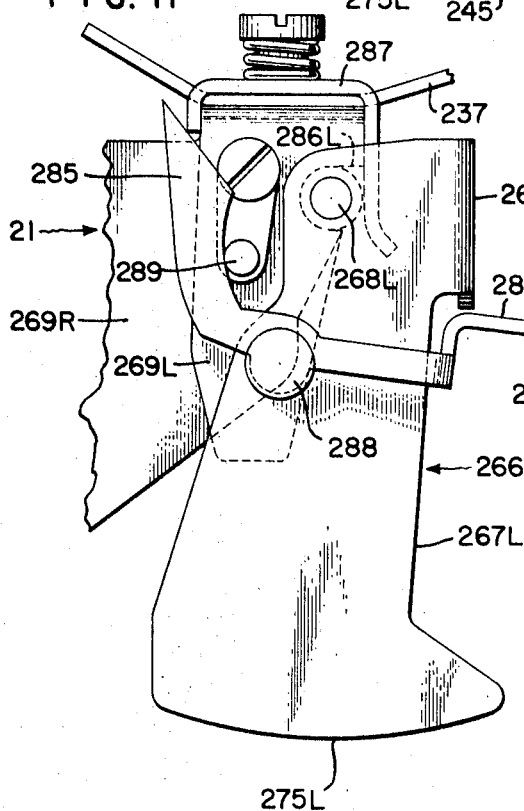
FIG. 11 is a side view of the mechanism shown in FIG. 10.
Figure 12:
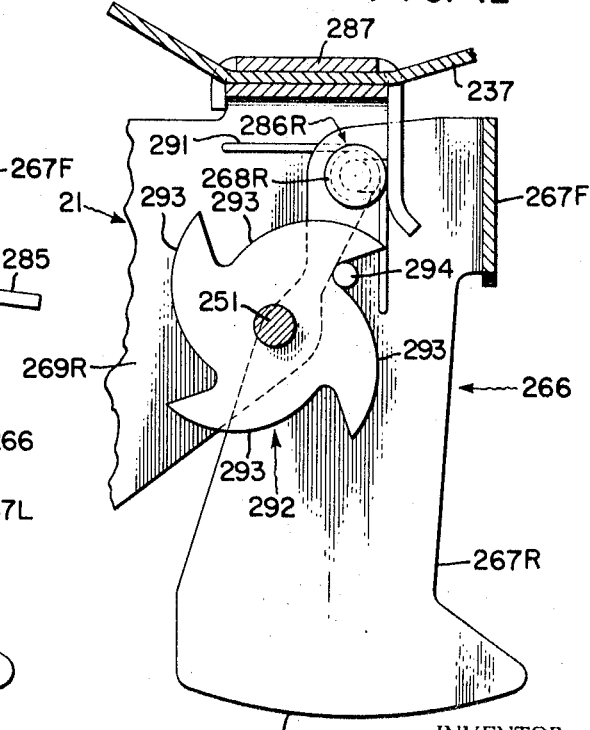
FIG. 12 is a cross-sectional view of a portion of the mechanism of FIG. 10 taken along the line 12–12 thereof.

The relationship between the printing carriage 21 and the ribbon carriage 266 is illustrated by FIGS. 11 and 12. FIG. 11 shows the boss 268L inserted in a notch 286L in the printing carriage side 269L. The boss is held in place by a spring bracket 287 which is mounted on the printing carriage 21. Pivotably mounted on the frame side 267L at a pivot point 288 is the bellcrank 285. A ribbon advance pin 289 fixed on the side 269L engages the crank 285. FIG. 12 shows the boss 268R inserted in a notch 286R in the printing carriage side 269R. The boss 268R is also held in place by the spring bracket 287. A torsion spring 291 is positioned about the boss 268R. The torsion spring 291 has one of its ends anchored to the carriage 21 and its other end to the carriage 266. Mounted on the shaft 251 is a cam 292 having four identical cam faces 293. The shaft 251, and the rotation thereof, was previously discussed in connection with FIG. 9. Each cam face 293 corresponds in time relationship with six sequential input channels, since in a complete rotation the shaft 251 is stepped 24 times and the 24 steps correspond in time with the stepped scanning of the 24 input channels.

A pin 294 is suitably mounted on the ribbon carriage side portion 267R to ride sequentially against the cam faces 293 as the shaft 251 is rotated. In FIG. 12, the pin 294 is shown resting in the root of the cam face 293 with the ribbon carriage 266 in its initial position, whereat the tilt of the frame 267 is at a minimum. As the shaft 251, as illustrated in FIG. 12, is stepped counterclockwise, the cam 292 tilts the frame 267 upward and to the right, thereby each step shifting the printing ribbon 245 to present a different color band to the printing elements 239 and 242. The cam 292 continues to tilt the frame 267 upward until the sixth step of rotation of the shaft 251. At that time the pin 294 falls off the peak of its then associated cam face 293 into the root of the next sequential cam face 293, thereby returning the ribbon carriage 266 to its initial position. The spring action of the torsion spring 291 returns the carriage 266 to its initial position and holds the pin 294 against its associated cam face 293. With further stepped rotation of the shaft 251, the color bands are recycled. In addition, each increment of tilt movement of the frame 267 causes the ribbon advance pin 289 to actuate the bellcrank 285 in corresponding increments. This stepped actuation of the crank 285, in turn, results in stepped actuation of the pawls 274 and corresponding incremental longitudinal advancement of the printing ribbon 245. In the exemplary recorder, the spool 271 being driven is rotated through the angular distance occupied by one rachet tooth 272 for each complete tilt cycle of the ribbon carriage frame. Further, the action of the pin 294 falling from the peak of one cam face 293 to the root of the next, returns the bellcrank 285 to its initial position, the pawls 274 thereby assuming their initial position with the instant driving pawl 274 prepared to engage the next associated rachet tooth 272.

In operation, input signals may be applied to each of the 24 input channels of the exemplary recorder. The mode of recorder operation is selected by manually switching the rotary switching means S5 by means of the selector switch handle 205. Turning the switch handle 205 rotates the ganged contacts 33, 34 and 35. The switching means S5, as was before stated, has the four switching positions MPT, OFF, SP and HOLD. In the OFF position, the movable contacts 33—35 are connected to dummy terminals and the recorder circuitry is disconnected from the AC power supply 31. The exemplary recorder is, therefore, deenergized or off. To energize the recorder, the switching means S5 may be switched to the MPT switching positions, in which mode the exemplary recorder operates as a multiple point recorder sequentially scanning, sensing and recording the input signals present on the several input channels. The power supply 31 is then connected to the recorder circuitry, AC power being supplied to the terminals 65 and 66 of the pulse generator 50, to the servomotor 18 and to the timing motor 54. The power supplied to the servomotor 18 is applied as an AC reference signal to the motor reference winding 19. Power is supplied to the timing motor 54 by applying the AC signals from the supply 31 across the motor winding 53. It is here noted that the condition of the switching combination, comprising the switching means S2 and the switch 46, determines whether power is or is not supplied to the timing motor winding 53. For the instant, it will be assumed that the movable contact 38 of the switching means S2 is switched to the contact 39, AC power thereby being supplied to the winding 53 to drive the timing motor 54.

Figure 13:
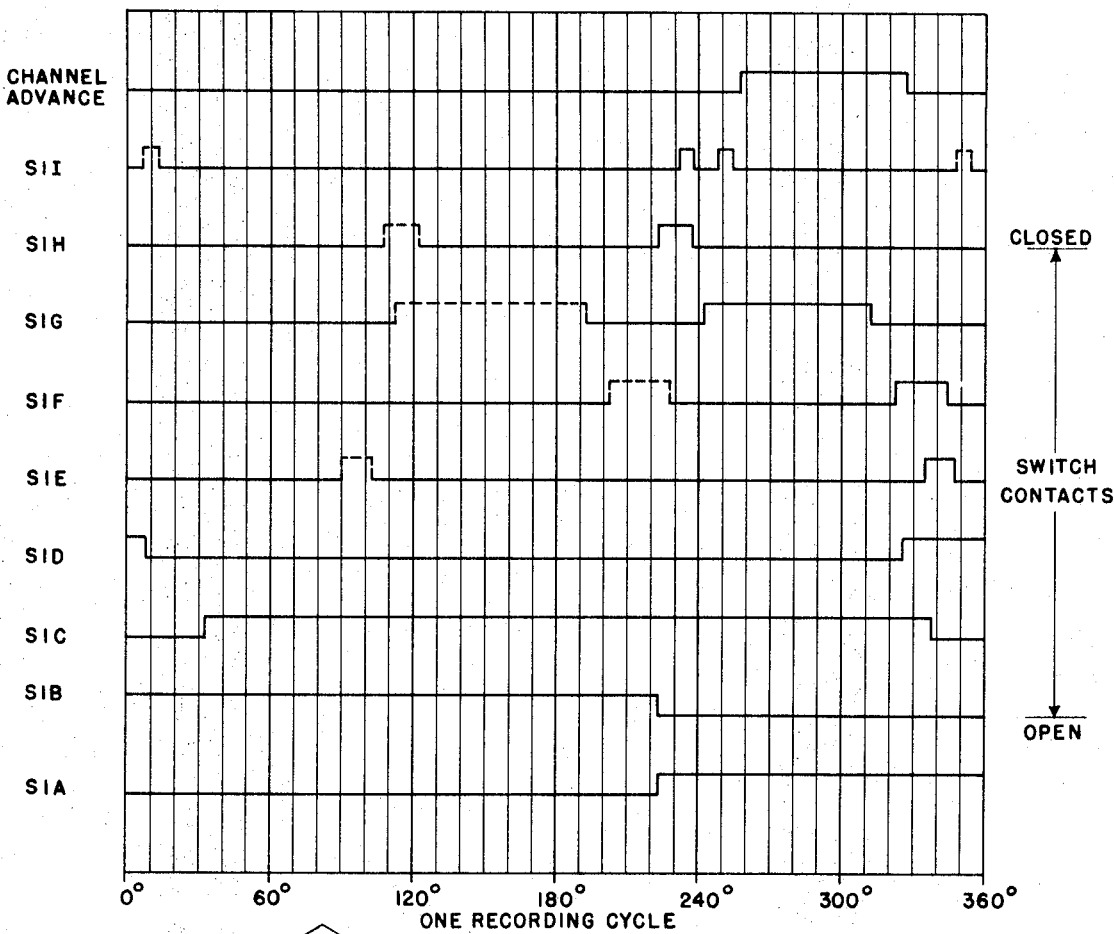
FIG. 13 is a graphical representation of the relative timed actuation of certain of the several timed switching elements of the recording instrument according to the present invention.

As before explained, in connection with FIG. 6, the timing motor 54 drives the rotor 206 to generate the timed switching sequence shown in FIG. 13. The traces S1A—S1I indicate the condition, i.e. opened or closed, of the respective switches S1A—S1I. The trace labeled "channel advance" indicates the engagement and actuation of the pawl 214 by the pin 209, the significance of which is explained hereinafter. Time intervals or instants of time in the recording cycle are identified by coordinates in degrees; the commencement of the cycle is designated by the coordinate 0° and a complete recording cycle has 360° to correspond with one rotation of the rotor 206. At the commencement of the recording cycle, the movable contacts 4 and 5 are sensing the input signal on one of the several pairs of input terminals 2 and 3. At the same instant, the switches S1A and S1B are, respectively, opened and closed to connect the servomotor control winding 16 across the output of the differential amplifier 15. The contacts 4 and 5 transmit the input signal sensed to a servosystem comprising the slidewire resistors 6 and 8, the slidewire contactor 7, the measuring circuit 9, the amplifier 15 and the servomotor 18. With the control winding 16 connected across the differential amplifier 15, the servosystem operates in a manner similar to other servo positioning systems well known in the art.

The output of the amplifier 15 drives the servomotor 18 which in turn positions the printing carriage 21 laterally over the record member 22. Mounted to be moved coincidently with the carriage 21 is the slidewire contactor 7 which is thereby positioned along the slidewire resistors 6 and 8. The servomotor 18 continues to position the carriage 21 and the slidewire contactor 7 until the input signal driving the amplifier 15 reaches a null. A null will occur when the signal picked off by the contactor 7 from the resistor 6 and fed through the measuring circuit 9 cancels the input signal to the amplifier 15 taken from the associated recorder input terminal 3. The electrical signal impressed on the resistor 6 is the input signal present on the associated recorder input terminal 2. Thereby the contactor 7 and the carriage 21 are positioned to represent proportionally the magnitude of the particular input signals being sensed on the associated recorder terminals 2 and 3. The servosystem will continue to be responsive to variations in these particular signals until that instant of time represented in the recording cycle by the coordinate 223°. At that instant the switch S1A is closed to short out the control winding 16; thereby further movement of the carriage 21 is prevented during the remainder of the recording cycle, in which time occurs the recorder's printing operation. Coincident with the closure of the switch S1A is the opening of the switch S1B to connect the resistor 17 as a current limiting resistor across the amplifier 15.

Following the closure of the switch S1A, the switch S1H is closed, as shown in FIG. 13, during the time interval represented by the coordinates 224°—237°. During this time, the switch S1I also closes for an instant. During the closure of the switch S1I, the pulse generator 50 generates an electrical pulse, as is hereinafter explained. The pulse flows through the closed switch S1H and energizes the solenoid 81. Depending on the condition of the switching means S3 and S4, solenoid 83 may be also energized by this electrical pulse. The solenoids 81 and 83 respond to the electrical pulse whereby to actuate the arms 238 and 241, respectively. As before explained in connection with FIG. 8, actuation of the arm 238 results in the printing of a trace mark, such as a dot, through use of the print element 239 and the printing ribbon 245. Similarly, as explained in connection with FIG. 9, actuation of the arm 241 results in the printing of a trace identifying mark, such as a numeral, through use of the print wheel 242 and the printing ribbon 245.

The print wheel 242 is indexed once during each complete recording cycle so that the trace identifying marks selectively printed correspond with the respective input channels being sensed. In conjunction with indexing the print wheel 242, the printing ribbon 245 is shifted so that each trace mark, or set of trace and trace identifying marks, printed are color coded. The indexing operation occurs once each recording cycle after the printing operation during the time interval of closure of the switch S1G represented by the coordinates 241°—312°. During this interval of closure of the switch S1G, the switch S1I is closed during the time interval represented by the coordinates 248°—255°. The closure of the switch S1I results in the generation of an electrical pulse by the pulse generator 50 which pulse energizes the solenoid 80. The solenoid 80 responds to the pulse whereby to actuate the pawl 252 which, as described in connection with FIG. 9, engages and turns the rachet wheel 250, thereby the shaft 251 is turned one twenty-fourth of a rotation. The rotation of the shaft 251 rotates the pin 256 and indexes the wheel 242, by means of the matching gears 259 and 265, to correspond with the next input channel to be sensed. As explained in connection with FIGS. 10—12, the one twenty-fourth of a rotation of the shaft 251 also tilts the ribbon carriage 266 to shift the printing ribbon 245 to present a new and next adjacent color band to the printing elements 239 and 242. The new color band corresponds with the next input channel to be sensed and the tilting motion of the carriage 266 incrementally advances the printing ribbon 245 laterally.

Following the latter closure of the switch S1I, the pin 209 which is mounted on the rotor 206 engages and actuates the pawl 214, as shown in FIG. 13, by the time interval represented by the coordinates 258°—328° on the CHANNEL ADVANCE trace. As explained in connection with FIG. 6, actuation of the pawl 214 rotates the gear wheel 217 and its shaft 225 one twenty-fourth of a rotation, i.e. one scan interval; thereby the movable contacts 4, 5, 38 and 62 which are each fixed to the shaft 225 are rotated one scan interval to the position corresponding with the next input channel. The movable contact 85 in the switching means S3 is also advanced as a result of the actuation of the pawl 214. The contact 85 which is driven through the gear wheels 217, 226 and 227 is rotated one forty-ninth of a rotation for each scan interval. Therefore the contact 85 will make one complete rotation for each forty-nine actuations of the pawl 214, since each actuation of the pawl 214 corresponds to one scan interval. Further since the switching means S3 has the four fixed contacts 86—89 thereon, one complete rotation of the contact 85 will close the switching means S3 at four different predetermined positions. The relative timing of the closure of the switching means S3 at the four different positions of rotation of the contact 85 is determined by the spacing of the contacts 86—89.

The switching means S3, with its four timed closures, which occur each 49 scan intervals, cooperates with the switching means S4 to provide the exemplary recorder with a frequency selection feature by which the frequency at which trace identifying marks are printed may be selected. The frequency at which trace identifying marks are printed is based on 49 scan intervals and is selected by switching the switch handle 204 to the desired position of the five switching positions of the switching means S4, in that manner rotating the movable contacts 110, 111 and 112. Considering these five switching positions, in the first position the movable contacts 110, 111 and 112 contact dummy contacts 96, 99 and 102, respectively. The switch S3 is then at all times open and no trace identifying marks are printed. The movable contact 112 contacts the fixed contact 103 in the second switching position, and the movable contacts 110 and 111 again contact the dummy contacts 96 and 99. A trace identifying mark will now be printed, coincident with the printing of a trace mark, each time the switching means S3 is closed at its contact 89, i.e. once for each 49 scan intervals.

Similarly in the third and fourth switching positions, trace marks will be printed two and four times, respectively, each 49 scan intervals. In the third switching position, the movable contacts 110, 111 and 112 contact the fixed contacts 97, 99 and 103, respectively, and trace identifying marks will be printed with trace marks at the instants the switching means S3 is closed at the fixed contacts 86 or 89. In the fourth switching position, the movable contacts 110, 111 and 112 contact the fixed contacts 97, 100 and 103, respectively, and trace identifying marks will be printed with trace marks when the switching means S3 is closed at the contacts 86, 87, 88 or 89. It is here noted that by basing the frequency at which trace identifying marks are printed on 49 scan intervals, the relationship is established that once a trace identifying mark is printed, e.g. for channel 1, 48 scan intervals thereafter there will be another trace identifying mark printed corresponding to the next sequential input channel, i.e. with the example the trace identifying mark printed would be for the next sequential input channel, channel 2. In the fifth switching position the movable contact 110 is connected through the fixed contact 98 and the conducting element 84 directly to the second terminal of the switch S1H. Trace identifying marks will, under this condition, be printed with every trace mark printed. The movable contacts 111 and 112 contact the dummy contacts 101 and 104, respectively, in the fifth switching position.

The switching means S2 and the switch 46 cooperate in the exemplary recorder to check the coincidence between the indexed position of the printing wheel 242 and the input channel being sensed. This coincidence is checked once for each 24 scan intervals when the channel 1 is sensed. The indexed position of the wheel 242 is indicated by the relative position of the pin 256 with respect to the arm 257 of the switch 46. The recorder is so designed that when the print wheel 242 is indexed to represent channel 1, the pin 256 depresses the arm 257 to switch the switch 46 to its fixed contact 47. For the purpose of the coincidence check, the input channel being sensed is indicated by the position of the movable contact 38 on the switching means S2. When channel 1 is sensed, the movable contact 38 is switched to contact the fixed contact 45. In a recording cycle, the wheel 242 is indexed as a result of the pulse generated by the pulse generator 50 upon the closure of the switch S11 during the time interval represented by the coordinates 248°—255°. Immediately after this time interval of closure of the switch S11, CHANNEL ADVANCE occurs and the contact 38 is rotated to its position corresponding with the next input channel. This stepped rotation of the contact 38 is completed while the switch S1G is still closed. Considering now a coincidence check, the input channel being sensed would be channel 1 and the movable contact 38 consequently would contact the fixed contact 45. Power would then continue to be supplied to the motor 54 to continue the recording cycle, if the wheel 242 were indexed to its channel 1 position since the switch 46 would be switched to the contact 47. If the wheel 242, however, were not indexed to its channel 1 position, the switch 46 would be switched to its contact 48 and the timing motor 54 would stop. At that instant the switch S1G would be in a closed condition. The power from the power supply 31 would then be supplied to the terminal 49 of the pulse generator 50. The pulse generator 50 would then operate as a relaxation oscillator generating pulses, as will be explained hereinafter, and the solenoid 80 would be rapidly pulsed to index the wheel 242. Indexing would continue until the wheel 242 is positioned on its channel 1 position in coincidence with the input channel being sensed. The switch 46 would then be switched to the fixed contact 47 and power would be supplied to the motor 54 to continue the recording cycle. Thereafter when input channel 2 is sensed, the contact 38 would be switched back to the fixed contact 39 and a coincidence check would not again occur until the channel 1 is again sensed.

As indicated by prior discussion, the pulse generator 50 generates pulses to energize the several solenoids in the recorder circuitry which are selectively connected as loads across the generator output terminals 68 and 69. These pulses may be developed by either of two different modes of operation, the first one of which occurs upon the closure of the switch S11. In the pulse generator 50, the diode bridge 114 receives and fullwave rectifies the AC power supplied by the power supply 31 into a unidirectional signal. While the switch S11 is open, this unidirectional signal charges the capacitor 125 through the diode 119 and charges the capacitor 127 through the resistor 126 and the diode 119. Upon closure of the switch S11, the resistor 126 acts to decouple the capacitor 127 from the charging circuit, which circuit still continues to charge the capacitor 125. The capacitor 127, thus decoupled, discharges through the current path including the resistor 128 and 129, and also through the parallel current path including the resistor 128, the Zener diode 130 and the resistor 131. The current through the resistor 131 generates a voltage upon the control electrode 132 which turns on the silicon control rectifier 133. With the rectifier turned on, the unidirectional signal provided by the diode bridge 114 will appear across the output terminals 68 and 69; thereby a pulse is generated by the pulse generator 50 in accordance with the first mode of operation.

The pulse generator 50, in its second mode of pulse generation, acts as a relaxation oscillator producing a series of pulses in a relatively rapid sequence. In this mode of operation, the AC signal from the power supply terminal 36 is applied to the generator terminal 49. This AC signal is rectified by the network comprising the resistors 155 and 149, the diodes 147 and 156, and the capacitor 148. The capacitor 148 is thereby charged so as to provide a unidirectional source of power for the relaxation oscillator. The oscillator comprises the resistors 142, 143, 144, 146 and 131, the capacitor 145 and the unijunction 141. This effective unidirectional power source provided by the charged capacitor 148 established the bias in the relaxation oscillator and charges the capacitor 145 at a rate determined by the R-C time constant provided by the R-C network. The capacitor 145 continues to charge until the voltage impressed on the emitter electrode of the unijunction 141 turns on the unijunction 141. The capacitor 145 then discharges through the resistor 146, the unijunction 141 and the resistor 131. It is noted that the point at which the unijunction 141 turns on is determined by the relation between the values of resistance of the resistors 131 and 143. The current through the resistor 131 then causes a sufficient voltage to be impressed on the control electrode 132 to turn on the silicon controlled rectifier 133; thereby a pulse is generated by the pulse generator 50 in accordance with the second mode of operation. Once the capacitor 145 is discharged, the unijunction 141 and, in turn, the silicon controlled rectifier 133 are turned off. The capacitor 145 will thereafter recharge and the relaxation oscillator will commence another cycle of oscillation. Thus, so long as an input signal is applied to the terminal 49, a series of pulses will be generated at the frequency determined by the parameters of the relaxation oscillator.

In the pulse generator 50, the diode 140 is connected reverse biased across the output terminals 68 and 69. This diode 140 functions to dissipate the energy of the back electromotive force resulting with the deenergization of the several solenoids used in the recorder as loads across the generators output terminals 68 and 69.

With the switching means S5 switched to the MPT position, the switches S1C, S1D, S1E and S1F served no function in the recorder operation; the recorder operated as a multiple-point recorder, as previously described. By switching the switching means S5 to the SP switching position, a channel selection or selective printing feature may be provided by use of the timed action of the switches S1C, S1E and S1F combined with the switching means S6. The exemplary recorder will operate as a multiple recorder, as before, except that now the signal on each input channel may be selectively skipped or recorded.

The selection to skip or record the signal on each input channel is made by switching the associated switching means 64 in the switching means S6. As before described, the switching means S6 has 24 fixed contacts 63 which are scanned by the ganged contact 62 in timed correspondence with the input channels being scanned. Each contact 63 thereby corresponds with a particular input channel. The signal on a specific input channel is recorded when the associated switching means 64 is switched to contact the conducting element 51 and is skipped when the switching means is switched to contact the conducting element 61.

In a recording cycle of the SP mode of recorder operation, the switching means 64 associated with the channel of the input signal to be recorded is switched to contact the conducting element 51. At the commencement of the cycle, i.e. at the instant of time represented by the coordinate 0°, the switch S1C is open and AC power is supplied to the timing motor field winding 53 by way of the switching means S6, i.e. through the conducting element 52, the contact 62, the associated contact 63, the associated switching means 64 and the conducting element 51. The recording cycle then proceeds as in the MPT mode of operation. The switch S1C is thereafter closed in the cycle during the time interval represented by the coordinate 033°—338°. While the switch S1C is closed, CHANNEL ADVANCE occurs in the time interval represented by the coordinates 258°—328°. During CHANNEL ADVANCE, the contact 62, along with the movable contacts 4 and 5, are stepped to their position corresponding with the next sequential input channel. As CHANNEL ADVANCE is completed, the switch S1F closes in the interval of time represented by the coordinates 322°—344°, and during this closure of the switch S1F, the switch S1E closes over the time interval represented by the coordinates 332°—344°.

The channel selection feature is provided in the SP mode of operation by the relation between the switches S1C, S1E and S1F which exists at the instant of time represented by the coordinate 338°. At that instant the switch S1C opens, the switches S1E and S1F are closed, and the contact 62 has been positioned on the fixed contact 63 corresponding with the next input channel. If this next channel has been selected to be recorded, the associated switching means 64 will be switched to the conductive element 51; power will thereby continue to be supplied to the timing motor 54, the recording cycle will continue and the signal on the next input channel will be recorded. If, however, this next input channel has been selected to be skipped, the associated switching means 64 will be switched to the conducting element 61. The timing motor 54 will then be stopped and the power from the power supply 31 will be applied through the closed switch S1E as an input to the terminal 49 of the pulse generator 50. The generator 50, as before described, will then supply an electrical pulse through the closed switch S1F to simultaneously energize the solenoids 79 and 80. Energization of the solenoid 79 will actuate the arm 221, as discussed in connection with FIG. 6, to actuate the pawl 214. Thereby the contacts 4, 5, 62 and 85 are advanced to their respective positions corresponding with the input channel next following in sequence. The energization of the solenoid 80, as before explained, shifts and advances the printing ribbon 245 and indexes the print wheel 242 to correspond with this next following input channel. If this next input channel is also selected to be skipped, i.e. the associated switching means 64 is switched to the conducting element 61, the solenoids 79 and 80 again will be energized, and so forth. The input channels will continue to be skipped until a channel is reached which is selected to be recorded, i.e. the associated switching means 64 is switched to contact the conducting element 51. At that time the timing motor 54 will be again supplied with power and the recording cycle will continue. Thus, each input channel may be selectively skipped or its signal recorded by appropriately switching the switching means 64. It is noted that the switching means 64 may be switched at any time during the recorder operation.

A further mode of recorder operation occurs when the switching means S5 is switched to the switching position HOLD. The object of the HOLD mode is to stop the recorder operation at a time when the servo balancing system is alive, i.e. the servomotor 18 is positioning the printing carriage 21 in response to the input signal being sensed. The instantaneous value of that input signal may then be observed by regarding the movement of the pointer 237 relative to the scale 236. If the recorder is switched to the HOLD mode in the time interval represented by the cycle coordinates 326°—008°, during which time the switch S1D is closed, the timing motor 54 will continue driving until the instant of time represented by the coordinate 007°, at which instant the motor 54 will stop. At this instant the servo balancing system is alive and the input signal being sensed may be observed. Further, if the recorder is switched to HOLD anytime within the time interval represented by the coordinates 008°—223°, the servomotor 18 is at that time being driven and the servo balancing system is alive; the input signal may then also be observed. During the time interval represented by the coordinates 223°—326°, however, the servo balancing system is dead and should the recorder be switched to HOLD during this time interval in the recording cycle, the pointer 237 will remain in that position representing the last input signal sensed.

It is here noted that the time closure of the switches S1E-S1I shown by the dotted traces in FIG. 13 serve no purpose in the recorder operation in any of its several modes. These switch closures indicated by the dotted traces are incidentally produced due to the specific construction of the rotor 206 used in the exemplary recorder. It is further noted that the chart drive motor 24 is controlled by the switch 32 and that to drive the record medium 22 during the recorder operation, the switch 32 should be closed.

Thus, there has been provided an improved multiple point recorder characterized by an improved printing means for printing trace records and trace identifying marks, with switching means for electrically selecting the input points to be processed and programmed by which the points selected may be changed during the recorder operation, and including color code means for coding the colors of the record traces representing the various input channels.

I claim:

1. A multiple-point recorder wherein a plurality of input channels are sequentially sensed and the values of the input signals sensed at the several channels are sequentially recorded on a record member, said recorder comprising:
   a. means for deriving control signals from each of said sequentially sensed input signals, said control signals being representative of the instantaneous magnitude of the corresponding ones of said input signals;
   b. carriage means;
   c. means for selectively positioning said carriage means in response to each of said control signals;
   d. a first print element carried by said carriage means, said first print element being operable to print trace marks for indicating the instantaneous position of said carriage means, hence, the magnitude of the input signal being sensed;
   e. a second print element carried by said carriage means, said second print element including indexable channel indicia and being operable to print trace identifying marks for identifying the corresponding input channel being sensed;
   f. first actuating means mounted on said carriage means;
   g. means mechanically coupling said first actuating means to said first print element;
   h. second actuating means mounted on said carriage means;
   i. means mechanically coupling said second actuating means to said second print element;
   j. means for producing actuator control signals in time-phase relationship with respect to said sensing of said input channels;
   k. indexing means mounted on said carriage, said indexing means being selectively operable in response to said actuator control signals to index said second print element in correspondence with the sequential sensing of said input channels;

l. first means electrically coupling said actuator control signals means to said first actuating means whereby to selectively operate said first actuating means to effect a printing of said trace marks on said record member;

m. second means electrically coupling said actuator control signal means to said second actuating means whereby to selectively operate said second actuating means to effect a printing of said trace identifying marks on said record member;

n. and third means electrically coupling said actuator control signal means to said indexing means whereby to selectively operate said indexing means to index said second print element.

2. The multiple-point recorder defined in claim 1 wherein said indexing means comprises:
a. third actuating means mounted on said carriage means;
b. and means mechanically coupling said third actuating means to said second print element.

3. The multiple-point recorder defined in claim 2 wherein said second print element comprises:
a. a print wheel bearing channel indicia corresponding to said input channels, said indicia being symmetrically spaced about the periphery of said print wheel;
b. and first gear means mounted on said print wheel; and wherein said means mechanically coupling said third actuating means to said second print element comprises:
c. second gear means carried by said carriage, said second gear means being indexable by said third actuating means to drive said first gear means whereby to index said print wheel an angular distance of one indicium for each actuation of said third actuating means.

4. The multiple-point recorder defined in claim 1 wherein said actuator control signal means is located remotely from said carriage means.

5. The multiple-point recorder defined in claim 1 wherein said actuator control signal means includes:
a. pulse generating means for producing actuator control signals;
b. timing means coupled to said pulse generating means for controlling the production of said actuator control signals in time-phase relationship with respect to said sensing of said input channels;
c. power means, said power means being coupled to said pulse generating means for supplying power thereto;
d. and means coupling said power means selectively to said timing means or to input terminals of said pulse generating means, whereby selectively to energize said timing means or to operate said pulse generating means.

6. The multiple-point recorded defined in claim 5 wherein said means coupling said power means selectively to said timing means or to input terminals of said pulse generating means includes a multiple channel switch operable in time-phase relationship with respect to said sensing of said input channels.

7. The multiple-point recorder defined in claim 6 wherein said multiple-channel switch comprises:
a. a circuit board having a base of nonconductive material;
b. a substantially circular first common conducting element bonded to one surface of said board;
c. a plurality of contact elements bonded to the same surface of said board, said contact elements being positioned in uniform circular array about, but spaced from, said first common conducting element;
d. rotatable contact means mounted in cooperative association with said board for rotation about an axis which is coaxial with said first common conducting element, said rotatable contact means including a contact bridge arranged to electrically connect any selected one of said individual contact elements to said common conducting element;
e. driving means coupled to said rotatable contact means for rotating said rotatable contact means about said axis in intermittent increments in time-phase relationship with respect to said sensing of said input channels whereby to move said contact bridge to effect sequential selection of said contact elements for electrical connection to said first common conducting element;
f. a second and third common conducting element arranged on said board in spaced relation to each other, to said first common conducting element and to said contact elements;
g. switching means mounted in cooperative association with said board for individually connecting each of said contact elements selectively with one or the other of said second and third common conducting elements;
h. first, second and third terminal means arranged on said board in spaced relation to each other and connected, respectively, to said first, said second and said third common conducting elements, said power means connected to said first terminal means, said input terminal of said pulse generating means connected to said second terminal means, and said timing means connected to said third terminal means.

8. The multiple-point recorder defined in claim 7 including a further switching means connected between said multiple-channel switch and said power means, said further switching means being selectively operable to connect said power means to said multiple-channel switch, or to said timing means bypassing said multiple-channel switch.

9. The multiple-point recorder defined in claim 8 wherein said second means electrically coupling said actuator control signal means to said second actuating means comprises switching means timed to periodically close in a timed relationship with respect to said sequential sensing of said input channels, said timed switching means having a plurality of preset conditions corresponding to predetermined ones of said actuator control signals, and means for selecting between said conditions for controlling the periodicity of the operation of said second actuating means.

10. The invention according to claim 1 wherein said first and second print elements print said trace and trace identifying marks, respectively, on said record member by use of the medium of a printing ribbon, said printing ribbon having a plurality of longitudinal color bands for color coding said trace and trace identifying marks, and including:
a. a ribbon carriage means for carrying and advancing said printing ribbon, said ribbon carriage means being mounted on said carriage means and carrying said printing ribbon to pass between said print elements and said record member;
b. tilt means for tilting said ribbon carriage means, with respect to said carriage means, sequentially to a plurality of different positions of tilt, a different color band of said ribbon being sequentially positioned to pass between said print elements and said record member for each of said different positions of tilt;
c. and actuating means for actuating said ribbon carriage means and said tilt means in time-phase relationship with respect to said sensing of input channels whereby to advance said ribbon and to color code said trace and trace identifying marks printed.

11. The invention according to claim 10 characterized by said ribbon carriage means comprising:
a. a frame member mounted on said carriage means;
b. first and second rotatable spool means each having a rachet, said first spool means being mounted at one side of said frame member, said second spool means being mounted in parallel relation to said first spool means at the opposite side of said frame member, said spool means being positioned on opposite sides of said print elements;
c. guide means carried by said frame member for guiding said printing ribbon to pass between said print elements and said record member, said printing ribbon being wound on said spool means and being guided by said guide means to be windable from one of said spool means to the other;
d. first pawl means carried by said frame member, said first pawl means being selectively operable to engage said rachet on said first spool means to wind said ribbon onto said first spool means;

e. second pawl means carried by said frame member, said second pawl means being selectively operable to engage said rachet on said second spool means to wind said ribbon onto said second spool means;

f. biasing means for biasing said first and second pawl means toward engagement with said associated rachets on said spool means;

g. toggle means carried by said frame, said toggle means including coupling means coupling said toggle means to said first and second pawl means for selectively disengaging one or the other of said pawl means from its associated rachet, said toggle means being operable to a first or second toggle position for selectively disengaging said first or second pawl means, respectively, from its associated rachet, said two toggle positions corresponding, respectively, with opposite directions of winding of said ribbon from one spool means to the other, said pawl means on said ribbon carriage means being actuated by said third actuating means, and said toggle means being responsive to the amount of said printing ribbon on one or the other of said spool means to actuate said toggle means to the one or the other of said two toggle positions whereby to reverse the direction of winding said ribbon to prevent said ribbon from being completely unwound from one or the other of said spool means.

12. A multiple-point recorder wherein a plurality of input channels are sequentially sensed and selected ones of said input channels are selected for recordation on a record member, said recorder comprising:

a. servo amplifier;

b. a scanning means connecting said input channels sequentially to said servo amplifier;

c. print means operable to effect a recordation of the signals on said input channels;

d. servo means responsive to output signals from said servo amplifier to position said print means relative to said record member;

e. control signal generating means operable to produce control signals in time-phase relationship to the sequential sensing of said input channels by said scanning means;

f. actuating means coupled to said print means and responsive to said control signals to actuate said print means whereby to effect a recordation on said record member;

g. means for establishing a series of time intervals corresponding to the scanning of said input channels;

h. selection means selectively operable to select predetermined ones of said time intervals corresponding to said selected ones of said input channels;

i. and means responsive to said selection means to control the energization of said actuating means whereby said actuating means is energized only during said selected intervals.

13. The multiple-point recorder defined in claim 12 wherein said means for establishing a series of timed intervals comprises a second scanning means synchronously operable with said first mentioned scanning means, and wherein said selection means comprises a plurality of switching means corresponding in number with said input channels, said second scanning means being operable to sequentially scan said switching means whereby each of said switching means corresponds to one of said time intervals.